United States Patent [19]
Nowak et al.

[11] Patent Number: 5,269,543
[45] Date of Patent: Dec. 14, 1993

[54] MECHANISM FOR CLOSING A COLLET

[76] Inventors: Florian I. Nowak, 16 Dean Dr., Newington, Conn. 06111; Jay P. Giblin, 1050 Splitrock Rd., Cheshire, Conn. 06410

[21] Appl. No.: 926,276

[22] Filed: Aug. 10, 1992

[51] Int. Cl.⁵ ............................................. B23B 31/26
[52] U.S. Cl. ........................................ 279/146; 279/50
[58] Field of Search ..................... 279/50, 51, 57, 58, 279/146

[56] References Cited

U.S. PATENT DOCUMENTS

| | | | |
|---|---|---|---|
| 4,418,925 | 12/1983 | Nowak | 279/50 |
| 4,509,765 | 4/1985 | Nowak | 279/50 |
| 4,995,625 | 2/1991 | Nowak | 279/1 C |

FOREIGN PATENT DOCUMENTS 1096039  6/1984  U.S.S.R. ............................. 279/146

Primary Examiner—Steven C. Bishop
Attorney, Agent, or Firm—Ira S. Dorman

[57] ABSTRACT

A collet-operating mechanism utilizes an array of wedge members for the transmission of closing force to the pressure collar. The wedge members are uniquely configured to optimally cooperate with a convexly arcuate bearing surface on the supporting sleeve member, to effect closure with greater facility and to produce an increased level of force amplification. In addition, the wedge members are of such form as to make feasible manufacture by conventional machining operations.

10 Claims, 5 Drawing Sheets

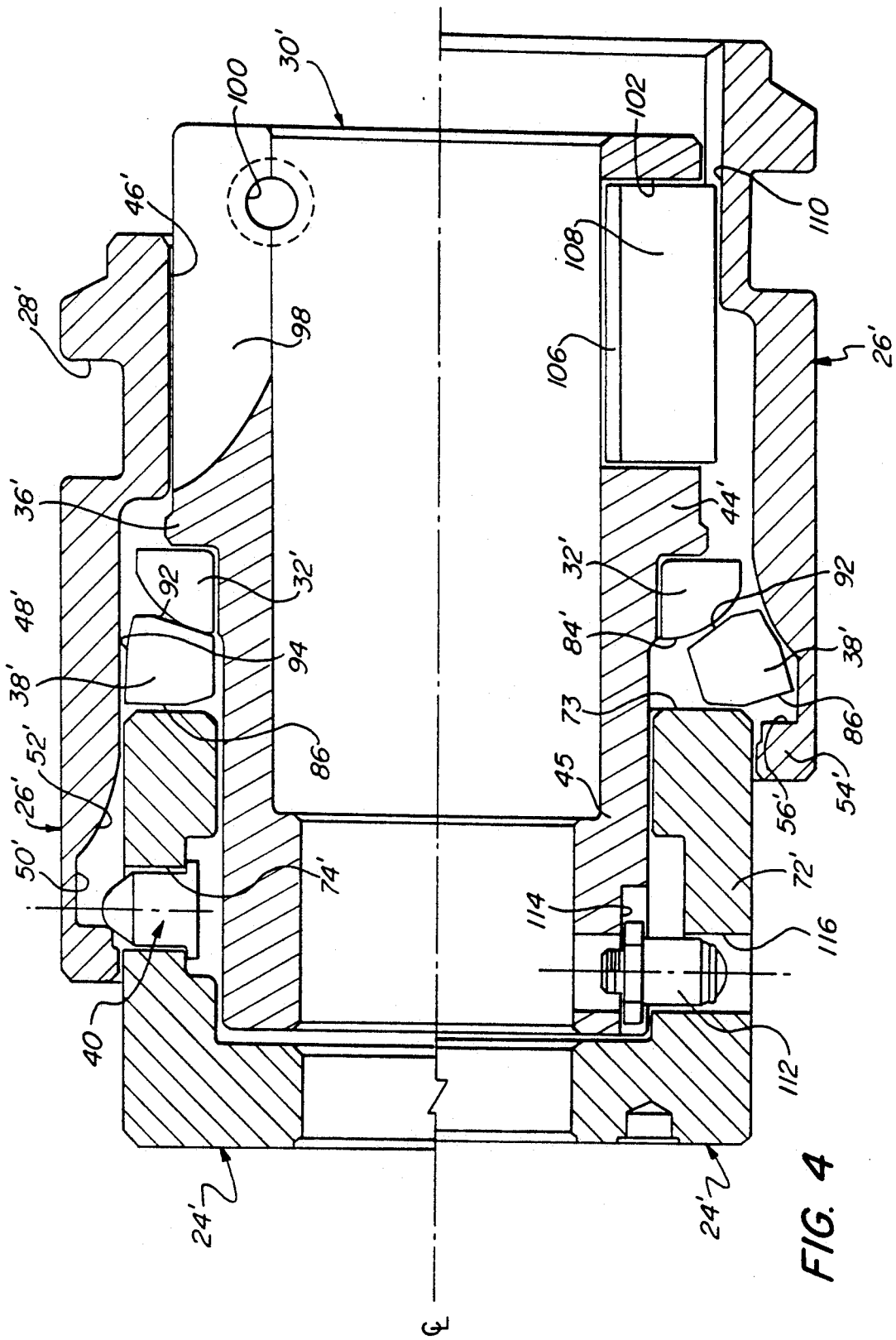

MECHANISM FOR CLOSING A COLLET

BACKGROUND OF THE INVENTION

The collet used to secure the work in an automatic bar machine, screw machine, or the like, is normally closed by shifting an outer spindle over an enlarged forward end portion of the collet. The means for shifting the outer spindle is generally referred to as the "collet closing mechanism," and for many years the most widely used mechanisms of this sort comprised an arrangement of chuck levers mounted in a chuck lever fulcrum. So-called "ball-chucker" systems have also been provided in which a circular array of ball bearings, held within a cage behind a slidably mounted thrust collar, are forced by an outer, slidably mounted sleeve into a circumferential channel defined behind the collar, so as to shift it forwardly.

More recently, a highly effective and durable collet closing mechanism has been provided in which a circular array of wedges provide force-transmitting elements. Such a mechanism, and improvements thereto, are described and claimed in Nowak U.S. Pat. No. 4,418,925, issued Dec. 6, 1983, No. 4,509,765, issued Apr. 9, 1985, and No. 4,995,625, issued Feb. 26, 1991. Despite the attributes of the Nowak mechanism, it would of course be beneficial to realize further improvements in effectiveness, operation, and cost and facility of manufacture.

SUMMARY OF THE DISCLOSURE

Accordingly, it is the broad object of the present invention to provide a novel wedge-operated mechanism for closing a collet, in which force transmission, ease of operation, and economy of manufacture may all be increased.

A more specific object of the invention is to provide such a mechanism in which the coacting, force-generating elements are so configured as to afford the improvements sought.

It has now been found that the foregoing and related objects of the present invention are readily attained in a collet-operating mechanism comprising: a supporting, inner sleeve member adapted for mounting upon a machine spindle; a flange portion extending circumferentially about the sleeve member; a collet closing member slidably mounted on the sleeve member; a multiplicity of substantially identical wedge members; and an outer, operating sleeve member slidably mounted on the supporting sleeve member. The flange portion on the supporting sleeve member is fixed against axial movement, in at least the rearward direction, and it has a bearing surface on its oppositely directed, forward face which is of convexly arcuate cross section, taken in axial planes (i.e., in planes in which the longitudinal axis of the sleeve member extends). The collet closing member has a generally annular bearing surface disposed in confronting relationship with the flange portion bearing surface, to cooperatively define therewith an inwardly tapered circumferential channel. The wedge members are disposed in a circular array about the sleeve member, for radial movement within the channel, and they conform generally thereto in cross-sectional configuration. Bearing surfaces on the forward and rearward faces of each of the wedge members are rectilinear and inwardly convergent, as taken in the axial planes defined; the bearing surface on the outward face is convexly arcuate along substantially the entire length of the face.

The operating sleeve member of the mechanism has a sidewall portion that extends over the outward faces of the wedge members, and defines a compound, circular recess therewithin which is comprised of a relatively large-radius forward section, a relatively small-radius rearward section, and a transition section therebetween. The operating sleeve is slidable between a rearward, open position, in which the forward section of its compound recess is disposed over the circumferential channel, and a forward, closed position in which the rearward section of the recess is so disposed. In open position, the relatively large radial dimension of the forward section of the operating sleeve recess permits the wedge members to assume radially outward positions within the channel. In closed position, the relatively small dimension of the rearward section forces the wedge members inwardly, causing them to increase the separation between the bearing surfaces of the flange portion and the collet-closing member, thereby shifting the latter forwardly and ultimately effecting closure of an operatively connected collet.

In the preferred embodiments of the invention, the bearing surface on the forward face of each wedge member will be disposed in a plane to which the longitudinal axis of the supporting sleeve member is normal, and will converge with that on the rearward face at an angle of 10° to 15°. The bearing surfaces on the forward and rearward faces will advantageously constitute radially outward and radially inward portions thereof, respectively, with the inward portion of the forward face desirably being convexly arcuate to provide a relieved inner edge. The forward face will preferably extend outwardly beyond the rearward face, taken in a radial sense and as viewed with the wedge members in their most inward positions (i.e., with the operating sleeve in its closed position). The wedge members will generally be symmetric about a medial, longitudinally extending radial plane, and will most desirably be integrally formed from a single piece of metal. The bearing surface on the rearward face will usually have a slight concavity, taken in planes to which the radial plane is perpendicular, so as to maximize the area of contact with the bearing surface on the sleeve member flange portion; the flatness of the forward bearing surfaces on the wedge members similarly maximizes the area of contact with the collet-closing member.

BRIEF DESCRIPTION OF THE DRAWINGS

FIG. 4 is a diagrammatic sectional view illustrating the mechanism of the invention, the portions of the Figure above and below the longitudinal centerline showing, respectively, its closed and open positions;

DETAILED DESCRIPTION OF THE ILLUSTRATED EMBODIMENT

Figure 1:
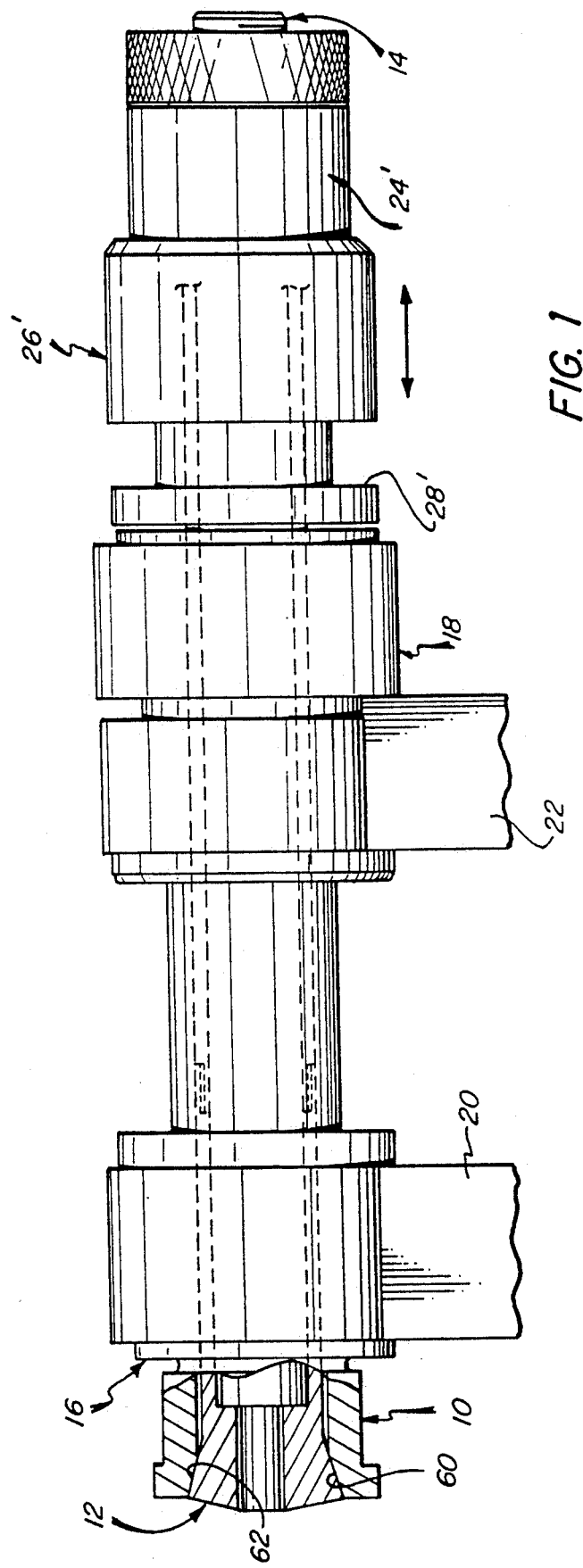
FIG. 1 is a fragmentary elevational view showing the mechanism of the invention installed in a machine and operatively connected to a collet.

Turning now in detail to the appended drawings, a spindle assembly of a kind typically employed in an automatic screw machine, and in which the collet-operating mechanism of the invention may suitably be installed, is shown in FIG. 1. It includes a spindle, generally designated by the numeral 10, within which is disposed a collet, generally designated by the numeral 12, and a threadably engaged, coaxial draw tube generally designated by the numeral 14. The spindle 10 is rotatably mounted in bearing assemblies, generally designated by the numerals 16 and 18, which are supported in frame portions 20 and 22, respectively.

The collet-operating mechanism includes a pressure collar, or collet-closing member, generally designated by the numeral 24', and an operating sleeve or outer housing member, generally designated by the numeral 26', slidably mounted for reciprocal movement over the pressure collar 24'. Such movement is transmitted through a machine-driven actuating shoe (not shown), having a collar part seated within the circumferential channel 28' formed into the outer housing 26'.

Figure 2:
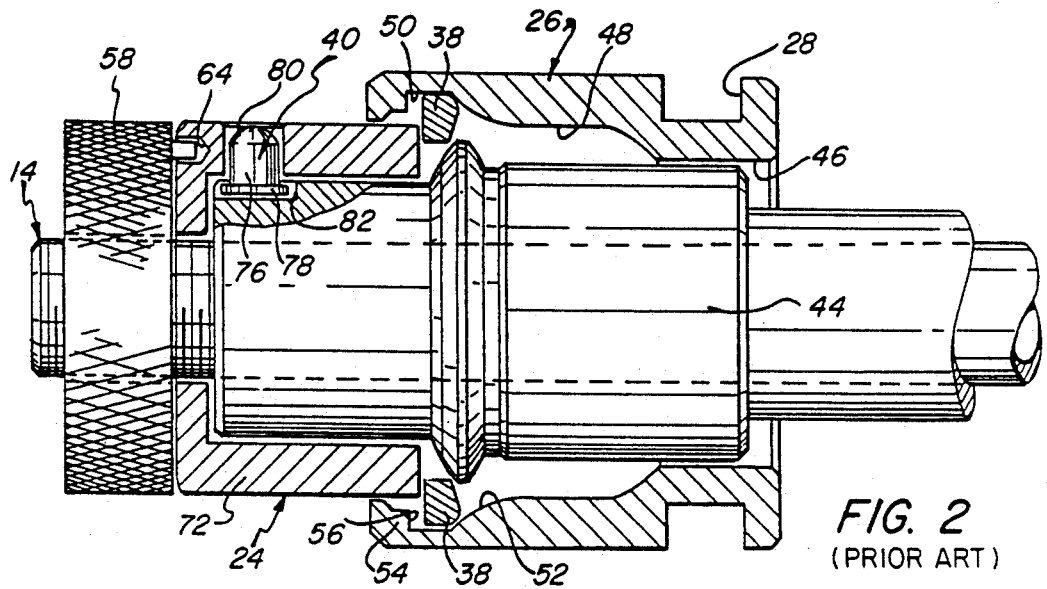
FIG. 2 is a sectional view showing a prior art collet-operating mechanism into which the features embodying the invention may be substituted, the mechanism being mounted upon a rotatable machine part and in condition for permitting the operatively connected collet to assume an open position.
Figure 3:
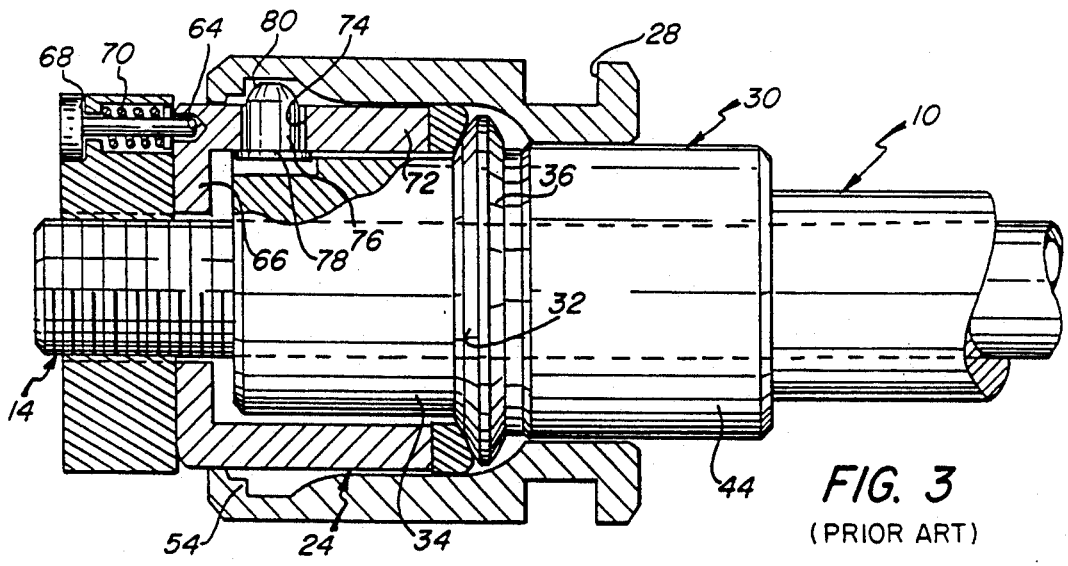
FIG. 3 is a view comparable to FIG. 2, showing the mechanism in condition for closing the collet.
Figure 6:
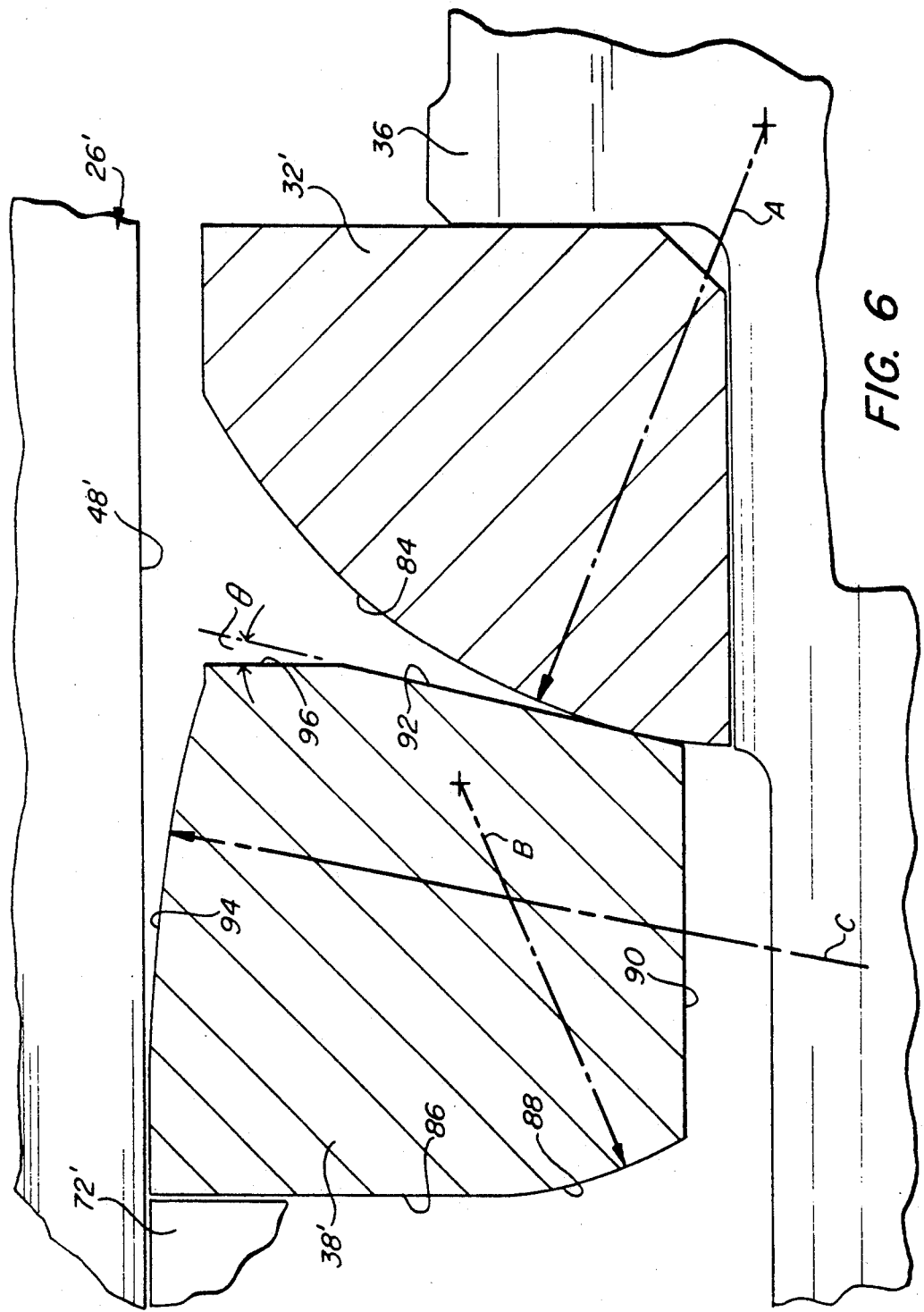
FIG. 6 is a fragmentary sectional view of the collet-operating mechanism of FIG. 4, taken medially through one of the wedge members and drawn to a greatly enlarged scale.
Figure 8:
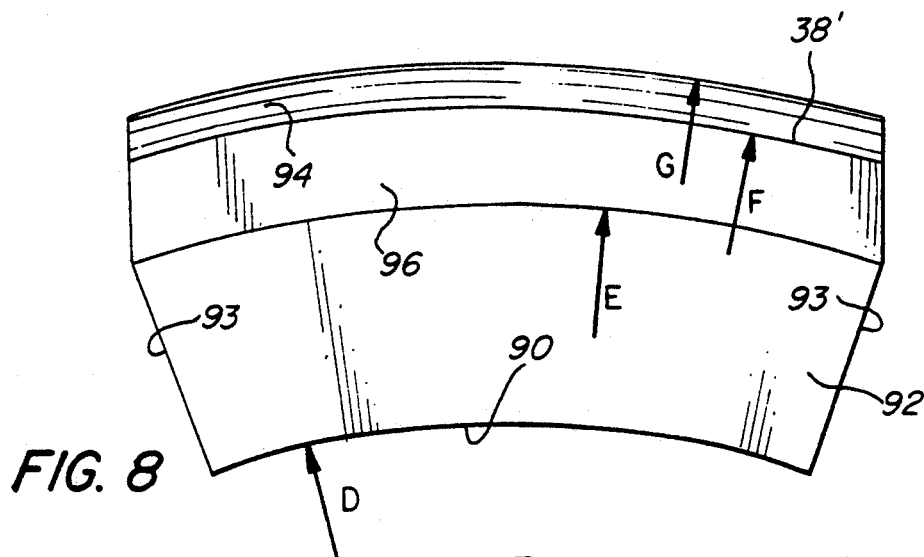
FIG. 8 is a rear elevational view of the wedge member.

With more specific reference to FIGS. 2 and 3, it is seen that the mechanism includes an inner supporting sleeve, generally designated by the numeral 30, mounted upon the spindle 10, and a wear ring 32 mounted upon a reduced-diameter forward portion 34 of the sleeve 30 and abutted against a collar element 36 thereof. The mechanism also includes a set of force-transmitting wedges 38, and three, equiangularly spaced holding pins generally designated by the numeral 40, only one of which is shown.

The inside surface of the operating sleeve 26 is machined to provide a compound recess, disposed adjacent the cylindrical bearing surface 46 by which the sleeve is slidably supported upon the wall portion 44. The recess consists of a relatively small diameter inner section 48, a relatively large diameter outer section 50, and a flared transition section 52 therebetween; a shoulder 54 lies contiguous to the large diameter section 50 at the outer end of the recess.

As will be appreciated, shifting of the operating sleeve 26 from the position shown in FIG. 2 to that of FIG. 3, so as to dispose it over the pressure collar 24, will force the wedges 38 into the tapered channel formed between the confronting bearing surfaces on the wear ring 32 and the pressure collar 24. This will effect a slight forward axial shifting of the pressure collar 24 (to the left in FIGS. 2 and 3), in turn shifting the nut 58 and the threadably attached draw tube 14 in the same direction. As a result, the collet 12 will be retracted into the spindle 10 (moving to the right in FIG. 1, its orientation being inverted from that of FIGS. 2 and 3), thereby causing compression of the collet elements by virtue of coaction of the mated tapered surface 60, 62 on the spindle and collet, 10, 12, respectively.

It will be noted that a ring of small sockets 64 are formed into the angular flange portion 66 on the end of the pressure collar 24, and that the nut 58 carries a locking pin 68, which is seated within an axially extending aperture and is biased, by spring 70, toward the pressure collar 24. Turning of the nut 58 on the threaded end portion 72 of the draw tube 14 will of course change slightly the axial position of the tube relative to the collet 12, thereby enabling ready adjustment of the level of gripping force applied to the work upon actuation by the operating mechanism. The spring-biased pin 68 will of course engage within any one of the sockets 64 that is brought into alignment with it, to thereby maintain the nut 58 in any selected position; the pin 68 can of course be retracted readily for facile adjustment.

Three apertures 74 (only one of which is visible in the Figures) are formed at equiangularly spaced (i.e., 120°) locations about the cylindrical sidewall portion 72 of the pressure collar 24, in a common plane perpendicular to the axis thereof. One of the holding pins 40 is disposed in each aperture 74; because the diameter of the shaft portions 76 is slightly smaller than the diameter of the apertures, the pins can slide freely therein with minimal play, and a head portion 78 on each keeps it from disengagement in a radially outward direction. Disengagement in the opposite direction is prevented by abutment of the pins 40 against the surface of the reduced diameter portion of the inner sleeve 30, into which longitudinally extending slots 82 are formed to accommodate the head portions 78 thereof. As is more fully described in the above-mentioned Nowak U.S. Pat. No. 4,995,625, centrifugal forces generated by rotation of the machine spindle will cause the tips 80 of the pins 40 to engage the collet operating member 26, to thereby maintain the collet in its closed position.

Turning now in greater detail to FIGS. 4 through 8 of the drawings, therein illustrated is a mechanism embodying the present invention, and certain components thereof. Features that are common to the several Figures are designated by the same numerals, marked however with a prime in respect of FIGS. 1 and 4 through 8.

The most significant modifications made to the mechanism of FIGS. 2 and 3 reside in the structures of the wear ring 32' and the force-transmitting wedges 38'. As to the wear ring, it will be noted that its forward bearing surface 84 is formed with a uniform, arcuate curvature. Typically, the ring will have an outside diameter of 4.325 inches, with the bearing surface 84 lying on an arc of radius A, having the value 0.75 inch.

Figure 7:
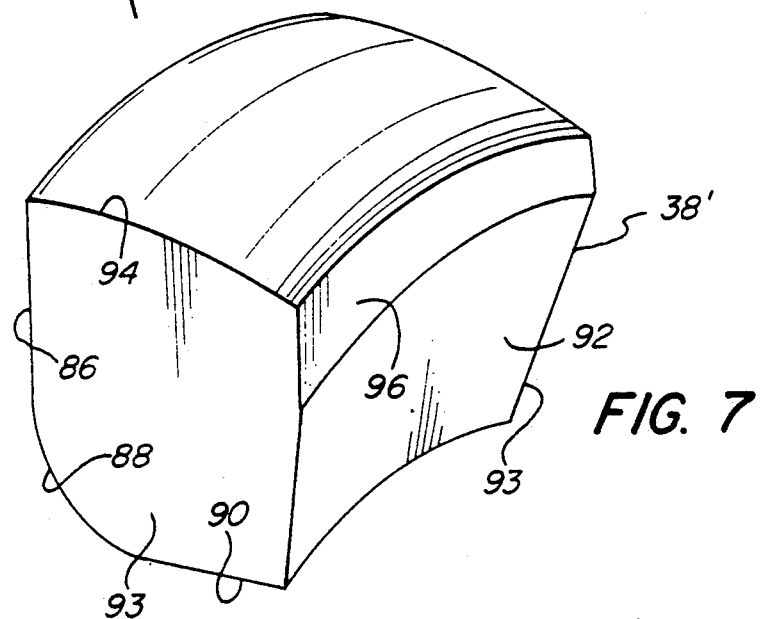
FIG. 7 is a perspective view of the wedge member shown in FIGS. 4 and 6.
Figure 5:
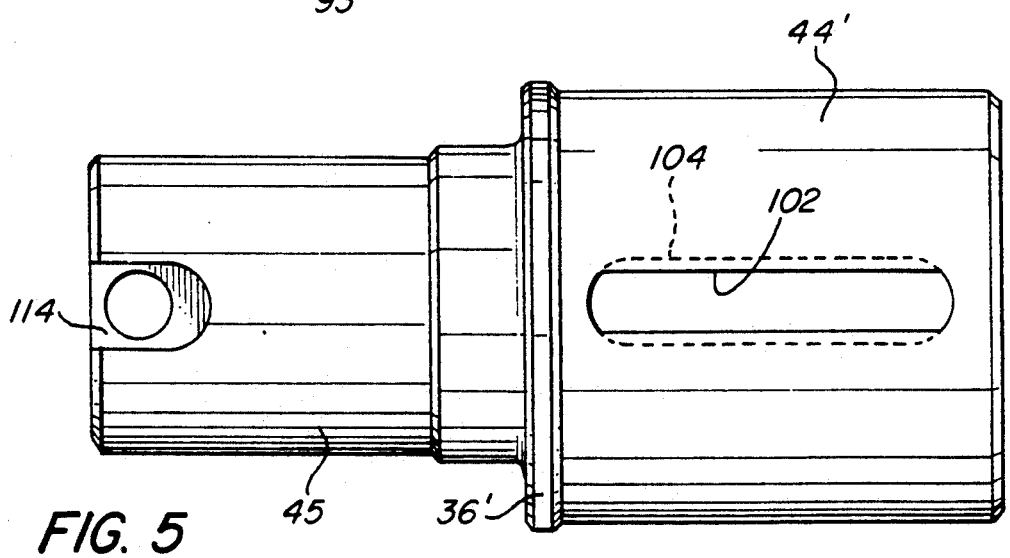
FIG. 5 is an elevational view of the inner, supporting sleeve member of the mechanism depicted in FIG. 4, drawn to a scale reduced therefrom.

The wedges 38' are of unique form. Each has a forward face that consists of a flat, outwardly disposed bearing portion 86 and an arcuately relieved, inward portion 88; in the closed (i.e., fully inserted) positions of the wedge members 38', the longitudinal axis of the inner sleeve member is normal to the common plane on which their face portions 86 are disposed. The bottom surface 90 is axially rectilinear, and is arcuate in planes transverse thereto. Similarly, the inward portion 92 of which the rearward face is comprised is rectilinear in a radial sense, but is slightly concave taken in planes perpendicular to its medial, radially extending plane, as best seen in FIG. 7. The outward forward portion 86 intersects the curved upper bearing face 94, which in turn intersects the planar, outward portion 96 of the rearward face. Portions 86 and 96 are parallel to one another, and the bottom surface 90 extends perpendicularly thereto.

By way of specific example, the front-to-rear dimension (i.e., axial length between the parallel surface portions 86 and 96) of the typical wedge member will be 0.64 inch; the top-to-bottom (i.e., radial) dimension will be 0.643 inch; and measured side-to-side (i.e., between the lateral surfaces 93) the wedge member subtends an angle of 39° (nine such members thereby constituting a full circular array). Further characterizing the typical wedge member, the face portion 86 will have a radial length of 0.38 inch; the lower portion 88 will have a radius B of 0.5 inch (taken, as shown, from a point projected inwardly on a line perpendicular to the planar face 86, at the radially innermost limit thereof); and the longitudinal arc of the upper bearing face will have a radius C of 2.0177 inch (taken from a point 0.075 inch displaced rearwardly from the face portion 86). With reference to the bottom face 90, the perpendicular distance to the outermost margin of the face portion 96 will be 0.568 inch, and the distance to the intersection of that portion with the portion 92 will be 0.4 inch; the values of the radii shown in FIG. 8 will be, in inches: D=1.594, E=1.994, F=2.162, and G=2.237. The value of $\theta$ (i.e., the angle between the surfaces 92 and 96, taken in a longitudinally extending radial plane therethrough) will normally be in the range 10° to 15°, preferably 13°.

The enlarged portion 44' of the inner sleeve member 30' of the mechanism is longitudinally divided at 98, and has formed secantally therethrough aligned bore portions 100 (only one of which is seen) which receive a clamping screw for securing the sleeve member on the spindle 10. In addition, the enlarged portion 44' is formed with a longitudinally extending radial slot 102, which is internally recessed at 104 along its side margins. As shown in FIG. 4, a T-shaped key is engaged within the slot 102, with its head portion 106 seated within the marginal recesses 104 and its tail portion 108 protruding slightly therefrom; the outer end of the portion 108 is slidably engaged in keyway 110 formed into the inner surface of the operating sleeve 26', thus preventing its rotation relative to the supporting sleeve member. The slot 102 also increases the flexibility of the enlarged portion 44', thereby facilitating assembly on the spindle and reducing the need for close manufacturing tolerances. A compound aperture and slot formation 114 is formed into the forward portion 45 of the member 30', and serves to seat a button-head cap screw assembly 112; the assembly is also engaged within hole 116 in the wall portion 72' of the collet-closing member 24', thereby affixing them in assembly and interengaging them against relative rotation.

The mechanism shown in FIGS. 4 through 8 operates in the same manner as does the mechanism discussed in reference to FIGS. 2 and 3. Thus, sliding the operating sleeve 26' forwardly, from the position shown in the lower half of FIG. 4 to that of the upper half, ultimately brings the small-diameter inner section 48' of the compound recess to bear upon the array of wedge members 38' (having passed through the transition section 52'), forcing them to their fully inward positions. The force applied is in turn amplified by the wedge members 38', and is transmitted through the surface portions 86, 92 thereof to the confronting surfaces 73, 84' of the closing member 24' and wear ring 32', respectively, thereby effecting a forward shifting of the closing member and operating the collet in the manner described.

Thus, it can be seen that the present invention provides a novel wedge-operated mechanism for closing a collet, in which force transmission, ease of operation, and economy of manufacture may all be increased. It will be appreciated that the coacting, force-generating elements, especially the novel wedge members employed, are so configured as to afford the improvements sought, and that the present invention represents an improvement upon the mechanism described and claimed in the above-mentioned Nowak U.S. Pat. No. 4,418,925; reference may therefore be had thereto for further description of features that are common to the instant invention.

Having thus described the invention what is claimed is:

1. A collet-operating mechanism comprising, in combination: a supporting sleeve member having a longitudinal axis; a flange portion extending circumferentially about said sleeve member and fixed thereon against axial movement in at least a rearward direction, said flange portion having a generally annular bearing surface on the oppositely directed forward face thereof; a collet-closing member slidably mounted for limited axial movement on said supporting sleeve member and having a generally annular bearing surface disposed in confronting relationship to said flange portion bearing surface, so as to cooperatively define therebetween an inwardly tapered circumferential channel; a multiplicity of substantially identical wedge members disposed in a circular array for radial movement within said channel and extending about said supporting sleeve member, each of said wedge members having a cross-sectional configuration, taken in axial planes in which said longitudinal axis extends, conforming generally to that of said channel and having bearing surfaces on the axially spaced forward and rearward faces, and on the radially outward face, thereof; and an operating sleeve member slidably mounted for axial movement on said supporting sleeve member, and having a sidewall portion extending over said outward faces of said wedge members and defining a compound circular recess therewithin comprised of a relatively large radius forward section, a relatively small radius rearward section, and a transition section therebetween, said operating sleeve member being movable between a rearward, open position in which said forward section of said recess is disposed over said circumferential channel, and a forward, closed position in which said rearward section is disposed over said channel, the relatively large dimensions of said forward section of said recess permitting said wedge members to assume radially outward positions within said channel with said operating sleeve member in said open position, and the relatively small dimensions of said rearward section forcing said wedge members to radially inward positions with said operating sleeve member in said closed position thereof, said wedge members acting upon said bearing surfaces of said flange portion and said closing member to shift said closing member forwardly in said closed position of said operating sleeve member, whereby said closing member can effect closure of a collet operatively connected thereto; wherein the improvement comprises said bearing surfaces having the following characteristics, all as taken in said axial planes: said annular bearing surface on said flange portion forward face being convexly arcuate; said bearing surfaces on said forward and rearward faces of each of said wedge members being rectilinear and inwardly convergent; and said bearing surface on said outward face of each of said wedge members being convexly arcuate along substantially the entire length of said outward face.

2. The mechanism of claim 1 wherein said bearing surface on said forward face of each of said wedge members is disposed in a plane to which said longitudinal axis is normal.

3. The mechanism of claim 2 wherein said surfaces on said forward and rearward faces of each of said wedge members converge at an angle of 10° to 15°.

4. The mechanism of claim 1 wherein said bearing surface on said forward face of each of said wedge members constitutes a radially outward portion thereof, and wherein said bearing surface on said rearward face thereof constitutes a radially inward portion thereof.

5. The mechanism of claim 4 wherein, in said closed position of said operating sleeve, said forward face on each of said wedge members extends radially outwardly further than does said rearward face thereof.

6. The mechanism of claim 4 wherein the radially inward portion of said forward face on each of said wedge members is convexly arcuate in said axial planes, providing a relieved inner edge thereon.

7. The mechanism of claim 1 wherein each of said wedge members is symmetric about a longitudinally extending radial plane extending medially therethrough, and wherein said bearing surface on said rearward face thereof is formed with a slight concavity, taken in planes to which said radial plane is perpendicular.

8. The mechanism of claim 1 wherein each of said wedge members is integrally formed from a single piece of metal.

9. The mechanism of claim 1 wherein said flange portion is comprised of a back-up flange integrally formed on said supporting sleeve member, and a separate wear ring assembled therewith and providing said annular bearing surface of said flange portion.

10. The mechanism of claim 1 wherein said transition section of said compound recess in said supporting sleeve member sidewall portion is of convexly arcuate cross section, taken in planes extending longitudinally therethrough.

* * * * *